(12) United States Patent
Doddaiah et al.

(10) Patent No.: US 11,899,950 B1
(45) Date of Patent: Feb. 13, 2024

(54) DOMAIN-SPECIFIC INITIAL CONFIGURATION OF HIGH-SPEED MEMORY

(71) Applicant: Dell Products, L.P., Hopkinton, MA (US)

(72) Inventors: Ramesh Doddaiah, Westborough, MA (US); Owen Martin, Hopedale, MA (US)

(73) Assignee: Dell Products, L.P., Hopkinton, MA (US)

( * ) Notice: Subject to any disclaimer, the term of this patent is extended or adjusted under 35 U.S.C. 154(b) by 15 days.

(21) Appl. No.: 17/965,149

(22) Filed: Oct. 13, 2022

(51) Int. Cl.
*G06F 3/00* (2006.01)
*G06F 3/06* (2006.01)

(52) U.S. Cl.
CPC .......... *G06F 3/0632* (2013.01); *G06F 3/0605* (2013.01); *G06F 3/067* (2013.01); *G06F 3/0631* (2013.01)

(58) Field of Classification Search
CPC .... G06F 3/0632; G06F 3/0605; G06F 3/0631; G06F 3/067
See application file for complete search history.

(56) References Cited

U.S. PATENT DOCUMENTS

2017/0300253 A1* 10/2017 Parker .................. G06F 3/0631
2021/0303216 A1* 9/2021 Qi .......................... G06F 13/28

* cited by examiner

*Primary Examiner* — Craig S Goldschmidt
(74) *Attorney, Agent, or Firm* — Anderson Gorecki LLP

(57) ABSTRACT

Domain-specific initial high-speed memory configuration policies are created by analyzing workloads of storage systems deployed in each of a plurality of customer domains. Each domain-specific initial high-speed memory configuration policy specifies the size of both a mirrored policy region and a non-mirrored policy region. The sizes of the mirrored and non-mirrored policy regions are based on the respective proportion of read IO and write IO operations in the analyzed workloads of each customer domain. Each domain-specific initial high-speed memory configuration policy also specifies a distribution of slot sizes that should be created in each of the policy regions, based on read IO and write IO histograms created from the analyzed workloads in each customer domain. When a new storage system is deployed, the customer domain where the new storage system will be used is determined, and the high-speed memory configuration policy for the domain is applied to the storage system.

18 Claims, 11 Drawing Sheets

Default Initial High-Speed Memory Segmentation

Domain-Specific Initial High-Speed Memory Segmentation

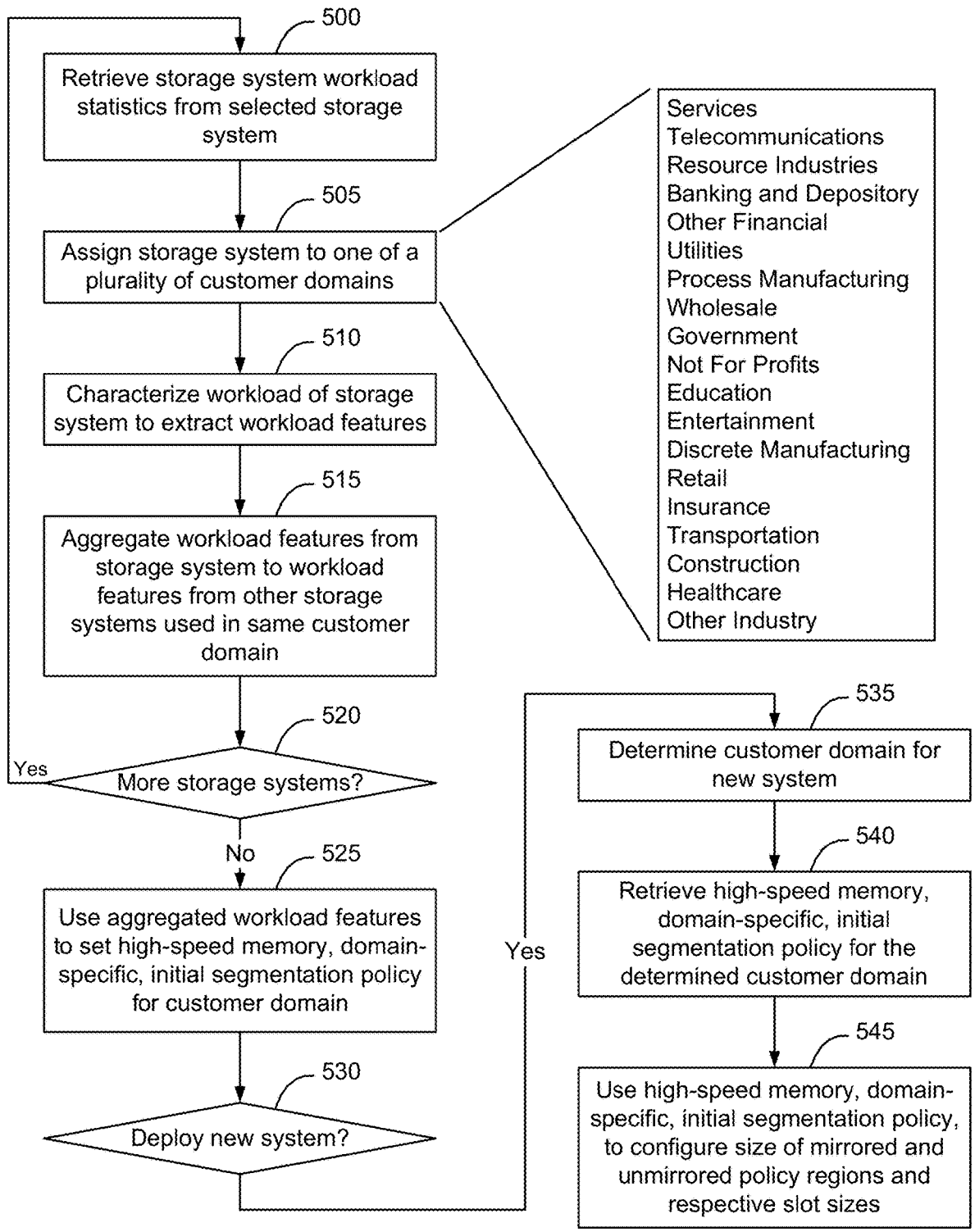

FIG. 6

Workload feature Data Structure 500

| Feature Name | Feature Description |
|---|---|
| IOPS | IO per second over sample interval |
| Total Reads | Sum of read events |
| Total Writes | Sum of write events |
| Percentage reads (%) | % of read events |
| Percentage writes (%) | % of write events |
| Read Size Histogram | Number of read events separated per size category |
| Write Size Histogram | Number of write events separated per size category |
| Random Read Hit | % of read events served from global memory |
| Random Read Miss | % of read events not served from global memory |
| Sequential Read | % read events that are consecutive |
| Random Write Hit | % of write events on data currently in global memory |
| Random Write Miss | % of write events on data not currently in global memory |
| Sequential Write | % write events that are consecutive |

FIG. 7
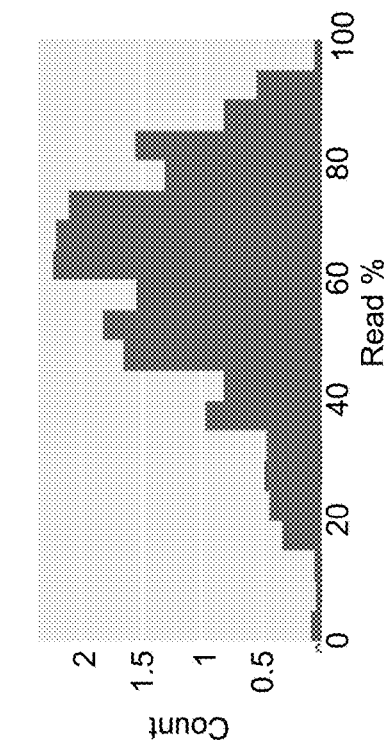
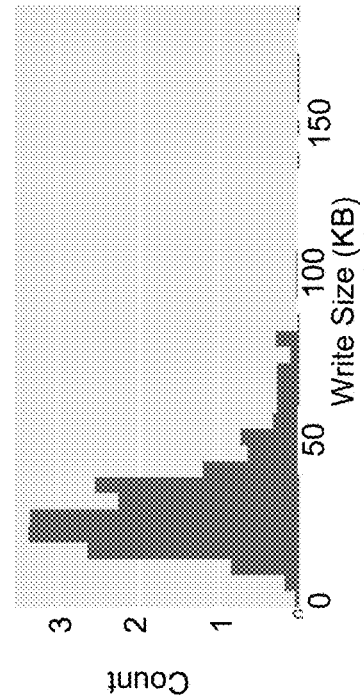
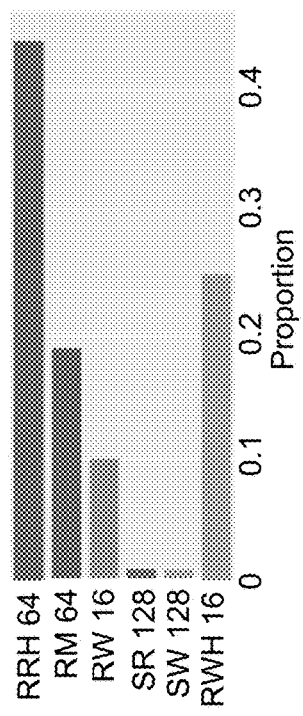
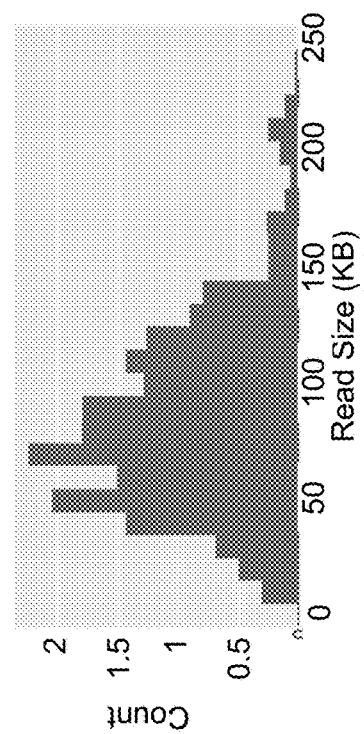

FIG. 11

Domain Specific Initial Shared Global Memory Segmentation Policy Data Structure 430

| Domain | Mirrored (Write IO) Pool Size (%) | | | Non-Mirrored (Read IO) Pool Size (%) | | |
|---|---|---|---|---|---|---|
| | Size 1 (%) | Size 2 (%) | Size 3 (%) | Size 1 (%) | Size 2 (%) | Size 3 (%) |
| Industry A | Mirrored Pool: 35% | | | Non-Mirrored Pool: 65% | | |
| | 10% | 15% | 10% | 5% | 50% | 10% |
| Industry B | Mirrored Pool: 50% | | | Non-Mirrored Pool: 50% | | |
| | 20% | 25% | 5% | 5% | 40% | 5% |
| Industry C | Mirrored Pool: 75% | | | Non-Mirrored Pool: 25% | | |
| | 25% | 25% | 25% | 5% | 10% | 10% |
| ••• | ••• | ••• | ••• | ••• | ••• | ••• |
| Industry N | Mirrored Pool: 40% | | | Non-Mirrored Pool: 60% | | |
| | 5% | 5% | 30% | 10% | 10% | 40% |

450-A, 450-B, 450-C, 450-N

DOMAIN-SPECIFIC INITIAL CONFIGURATION OF HIGH-SPEED MEMORY

FIELD

This disclosure relates to computing systems and related devices and methods and, more particularly, to a method and apparatus for determining domain-specific initial configuration of high-speed memory of a storage system.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A storage system has one or more storage engines, each of which has a pair of compute nodes. Each compute node has a high-speed memory, such as DRAM, that is used to temporarily store requested data in connection with performing read and write IO operations by the storage engine. Each high-speed memory has a plurality of policy regions (mirrored and non-mirrored), and each policy region is segmented into a plurality of slots. Slots of the high-speed memory are allocated to the read and write IOs as they are performed by the compute node. For example, in connection with a read IO by a host, the requested data is read into a slot of the high-speed memory of the compute node, and then read out to the host from the high-speed memory. In connection with a write IO by the host, the requested data is read into a slot of the high-speed memory of the compute node from the host, and then destaged (written) to back-end storage resources of the storage system by the compute node.

A set of IO operations on a storage system is referred to herein as a "workload" on the storage system. Different industries generate workloads with different workload characteristics. Example differences in the workload characteristics might be associated with different ratios of write IOs to read IOs, and differences in the proportion of the various sizes of the read and write IOs. According to some embodiments, to optimize initial use of the high-speed memory of the compute node, workloads on existing storage systems that are being used in particular customer domains are characterized, and the characterized workloads are used to set domain-specific initial configuration policies of high-speed memory on a per-customer domain basis. When a new storage system is to be deployed, the customer domain where the storage system will be used is determined, and the domain-specific initial configuration policy for the customer domain is used to implement an initial segmentation of the high-speed memory of the new storage system. As used herein, the term "segmentation" refers to separation of the high-speed memory into mirrored and unmirrored policy regions, and determination of slot sizes to be used within each of the policy regions.

Using a default initial segmentation policy for all newly deployed storage systems, regardless of customer domain, results in storage system configurations that may be sub-optimal for some workloads. By selecting a domain-specific initial configuration policy to be used to implement segmentation of the high-speed memory, it is possible to improve memory utilization of the high-speed memory, reduce response times of the storage system, and reduce the amount of adjustment required to converge on an optimal segmentation of the high-speed memory for the deployed storage system.

BRIEF DESCRIPTION OF THE DRAWINGS

FIG. 5 is a flow chart of an example process configured to create domain-specific initial configuration policies for high-speed memory, and to use the domain-specific initial configuration policies when configuring the high-speed memory of a new storage system, according to some embodiments.

FIG. 6 is a functional block diagram of an example workload feature data structure configured to be used to aggregate workload features of a set of storage systems on a per customer domain basis, according to some embodiments.

FIGS. 7-10 are graphs of example workload features of an example customer domain for four example industries, according to some embodiments.

FIG. 11 is a functional block diagram of an example data structure configured to store domain-specific high-speed memory initial configuration policies, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
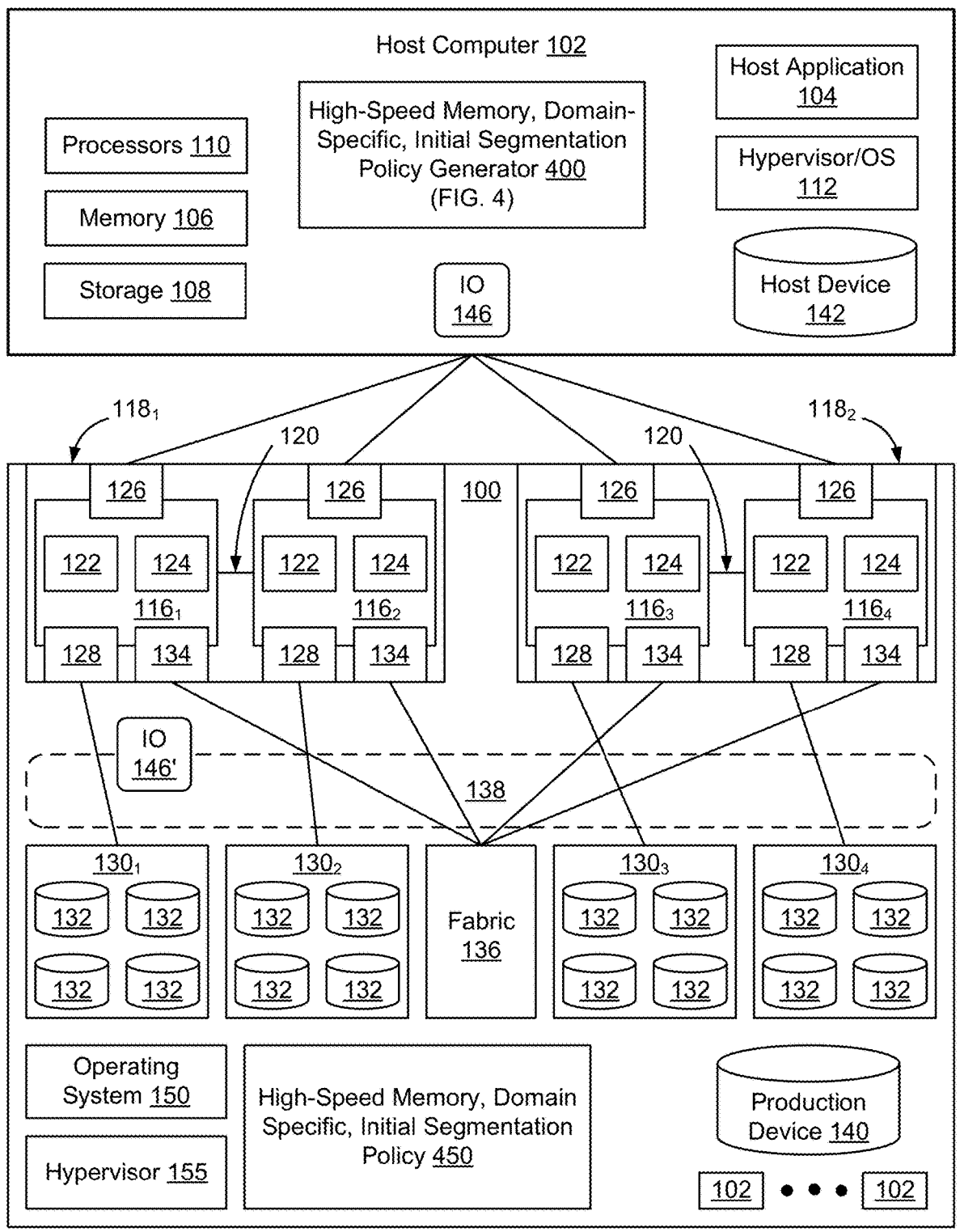
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile high-speed memory 124. The processors 122 may include a plurality of multi-core processors of one or more types, e.g., including multiple CPUs, GPUs, and combinations thereof. The local volatile memory 124 may include, for example and without limitation, any type of RAM. In some embodiments, the local volatile memory is implemented using Dynamic Random Access Memory (DRAM) or another high-speed volatile memory technology. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g., via DMA (Direct Memory Access) or RDMA (Remote Direct Memory Access). In some embodiments, the shared local memory is implemented as a high-speed memory using a technology such as DRAM.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

In some storage system architectures, any time an IO is processed by a storage engine 118, the storage engine 118 first copies the requested data into high-speed memory 124. The storage engine 118 then either reads the requested data out from high-speed memory 124 to the host 102 (in connection with a read IO), or writes (destages) the requested data out to back-end storage resources 132 (in connection with a write IO). The number of slots of high-speed memory 124 therefore limits the number of IO operations that a given compute storage engine can implement in a given time period.

Figure 2:
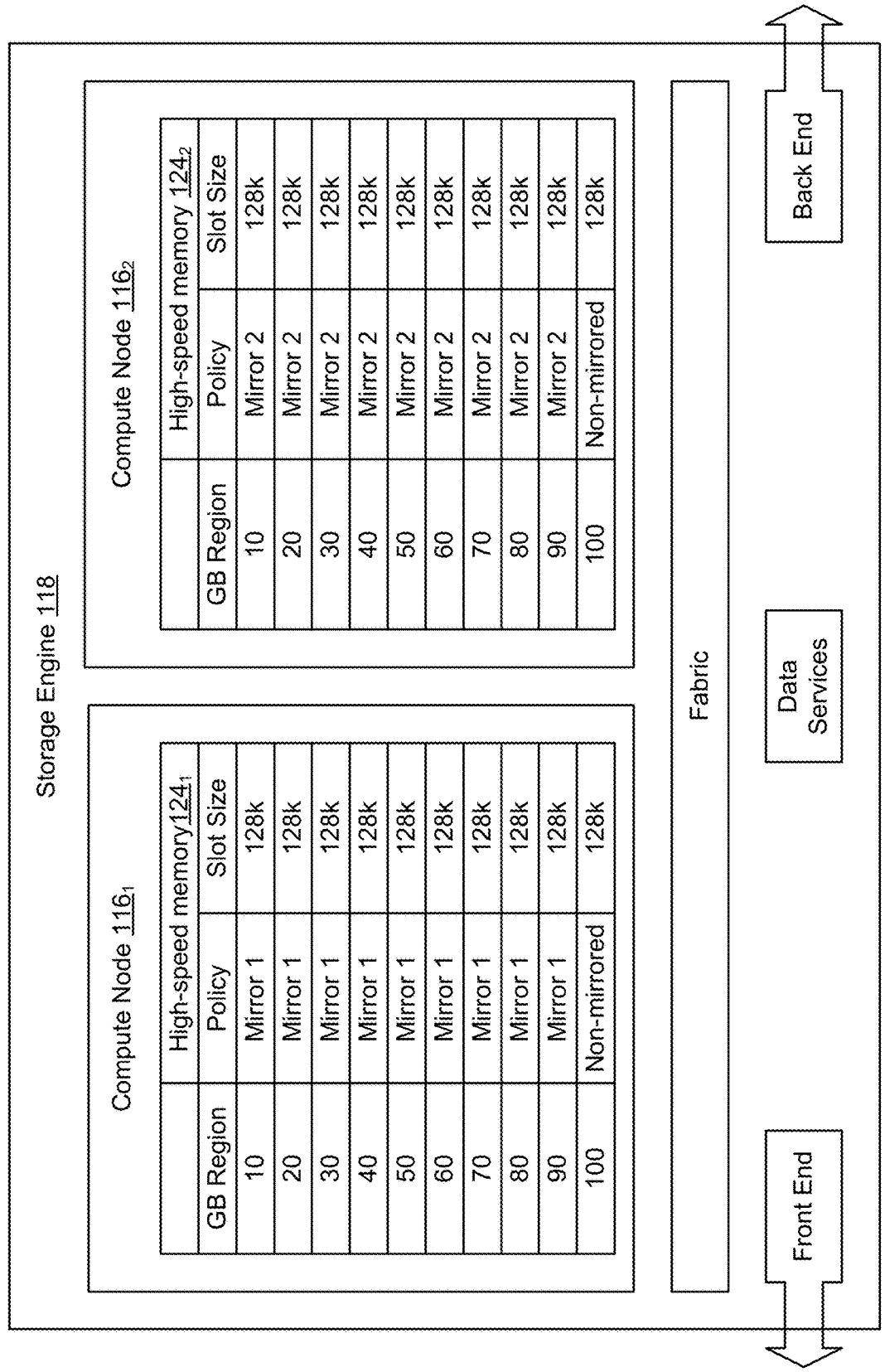
FIG. 2 is a functional block diagram of a storage engine having a pair of compute nodes, each compute node having high-speed memory that is partitioned using a default high-speed memory segmentation policy, according to some embodiments.

FIG. 2 is a functional block diagram of a storage engine having a pair of compute nodes, each node having high-speed memory that is partitioned using a default high-speed memory segmentation policy, according to some embodiments. As shown in FIG. 2, in some embodiments the storage engine 118 has a pair of two compute nodes 116. Having a pair of two compute nodes 116 provides redundancy within storage engine 118, such that if one of the two compute nodes 116 experiences failure, the other compute node 116 should be able to complete the requested IO operation.

When a write IO is received by the storage engine 118 from a host 102, the write IO contains data that is not otherwise stored on the storage system 100. Accordingly, in some embodiments the compute nodes $116_1$, $116_2$, implement a mirrored policy on a portion of each compute nodes' high-speed memory 124, which results in the same data being written to both the high-speed memory 1241 of compute node $116_1$, and to high-speed memory 1242 of compute node $116_2$. This provides redundant copies of the data associated with a write IO such that, if one of the compute nodes fails, the other compute node can destage the data associated with the write IO to back-end storage resources. Implementing a mirror policy on a "mirrored policy region" of the high-speed memory 124 is therefore important in connection with processing write IOs by the storage engine 118.

When a read IO is received by the storage engine 118 from a host 102, the read IO requests data that is already stored on storage resources of the storage system, such as on managed drives 132. Accordingly, when the read IO is processed by one of the compute nodes 116, the data does not need to be placed in a mirrored region of high-speed memory 124, since a backup copy of the data continues to reside in back-end storage resources 130. By configuring the high-speed memory 124 of the compute nodes 116 to include a "non-mirrored policy region", on which a non-mirrored policy is applied, it is therefore possible to increase the number of slots of high-speed memory 124 that are available to process read IO operations on the storage engine 118.

As used herein, the term "policy region" refers to a region of the high-speed memory 124 where a particular policy (mirrored or non-mirrored) is applied. A given region of the high-speed memory 124 will either have a "mirrored" policy applied to it or an "non-mirrored" policy applied to it. In some embodiments, the segmentation policy, for a particular domain, specifies the size of the policy regions. Workloads with larger numbers of read IOs might warrant application of a policy that has an increased amount of high-speed memory that is allocated to the non-mirrored policy region, whereas workloads with larger numbers of write IOs might warrant application of a policy that has an increased amount of high-speed memory that is allocated to the mirrored policy region.

Within a given policy region, the high-speed memory is divided into various sized slots. In some embodiments, the domain-specific segmentation policy for the high-speed memory also specifies the manner in which each of the policy regions should be divided by specifying the slot sizes to be used to implement each of the policy regions.

Different industries generate workloads that have different workload characteristics. For example, the workload from a first industry may be skewed to have a higher percentage read operations, whereas workload from a second industry may tend to have a higher percentage of write operations. Likewise, the workloads from different industries may have different size distributions or exhibit other characteristics that can affect the optimal segmentation policy that should be applied to the high-speed memory to optimize the segmentation configuration of the policy regions. Storage systems that are deployed to provide storage solutions in different industries are referred to herein as being deployed in different "customer domains". A domain-specific initial configuration policy, accordingly, is a high-speed memory segmentation policy that is based on historical workload patterns that are collected from storage systems that have been deployed in a particular customer domain to provide storage services to a particular industry.

According to some embodiments, respective deployed storage systems are allocated to one of a set of customer domains. Example customer domains might be, for example, retail, banking, industrial, insurance, etc. A more complete set of domains is shown in FIG. 5, although this list is also intended to be illustrative rather than all encompassing.

Deployed storage systems for each customer domain are identified, and workload characteristics for the workloads processed by the storage systems in the respective domain are aggregated. Based on the aggregated workload characteristics, a domain-specific initial configuration policy memory is created that is to be used to configure high-speed memory of storage systems when the storage systems are initially deployed into the respective customer domain. This process is iterated for each customer domain, resulting in creation of a separate domain-specific initial high-speed memory configuration policy for each customer domain. If a new storage system is to be deployed, the customer domain associated with the new storage system is determined, and the domain-specific initial high-speed memory configuration policy for the customer domain is used to create an initial configuration of the high-speed memory of the new storage system.

FIG. 2 is a functional block diagram of a storage engine having a pair of compute nodes $116_1$, $116_2$, each compute node 116 having high-speed memory 124 that is partitioned using a default a high-speed memory segmentation policy. In the example shown in FIG. 2, the default policy is that 90% of the high-speed memory should be used to implement the mirrored policy region, and that 10% of the high-speed memory should be used to implement the non-mirrored policy region. The segmentation size for each policy region has also been set, in this example default policy, to specify that all slots should have a uniform slot size equal to 128 KB.

Figure 3:
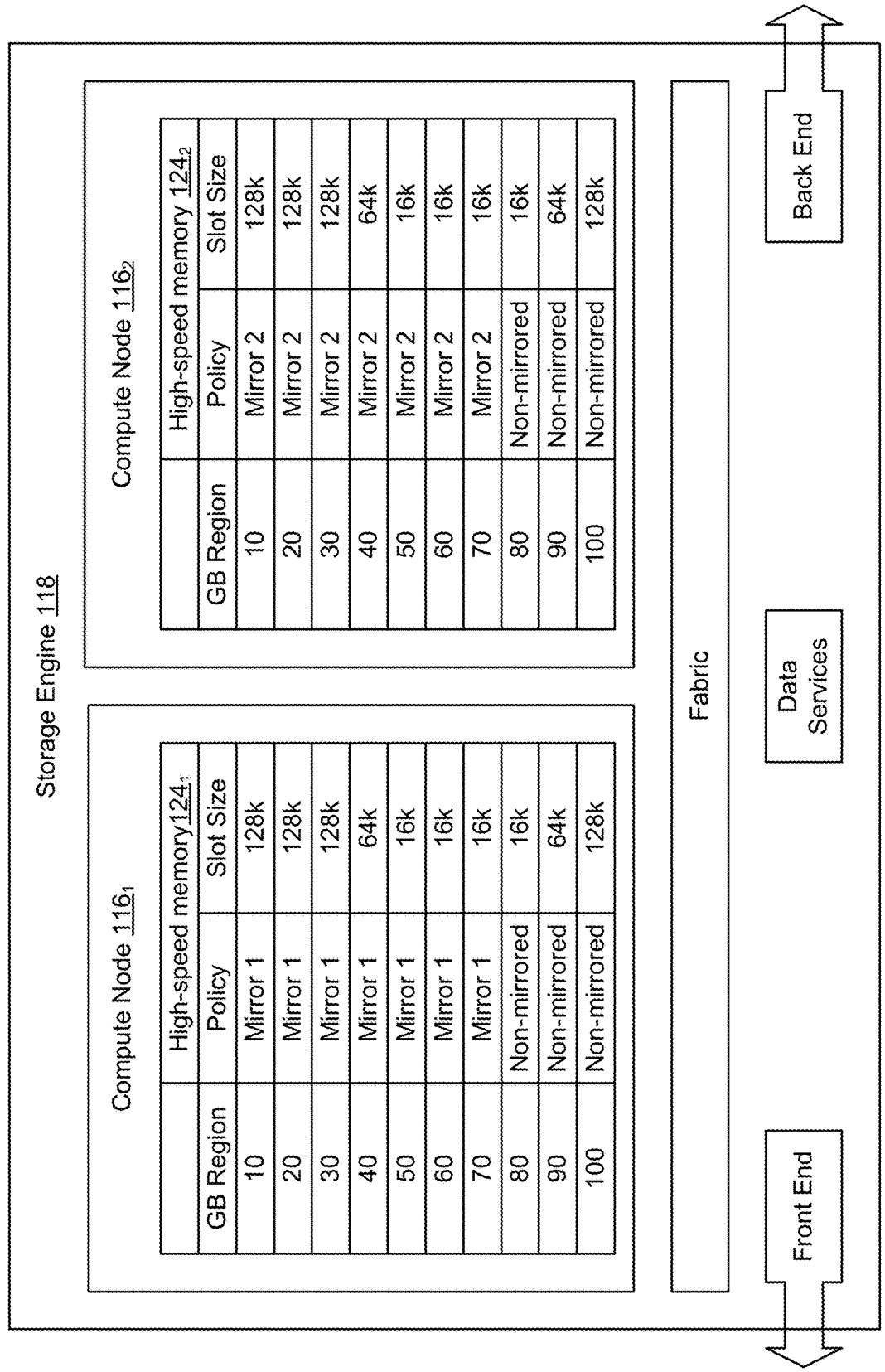
FIG. 3 is a functional block diagram of a storage engine having a pair of compute nodes, each compute node having high-speed memory that is partitioned using an example domain-specific initial configuration of high-speed memory, according to some embodiments.

FIG. 3 is a functional block diagram of a storage engine having a pair of compute nodes $116_1$, $116_2$, each compute node 116 having high-speed memory 124 that is partitioned using an example domain-specific initial high-speed memory configuration policy, according to some embodiments. In the example shown in FIG. 3, the example domain-specific initial high-speed memory configuration policy has specified that only 70% of the high-speed memory should be used to implement the mirrored policy region (rather than the default 90% of FIG. 2), and that 30% of the high-speed memory should be used to implement the non-mirrored policy region (rather than the default 10% of FIG. 2). The segmentation size for each policy region has also been adjusted, such that the mirrored policy region includes a mixture of 16 KB, 64 KB, and 128 KB slot sizes, and likewise the non-mirrored policy region includes a mixture of 16 KB, 64 KB, and 128 KB slot sizes.

Figure 4:
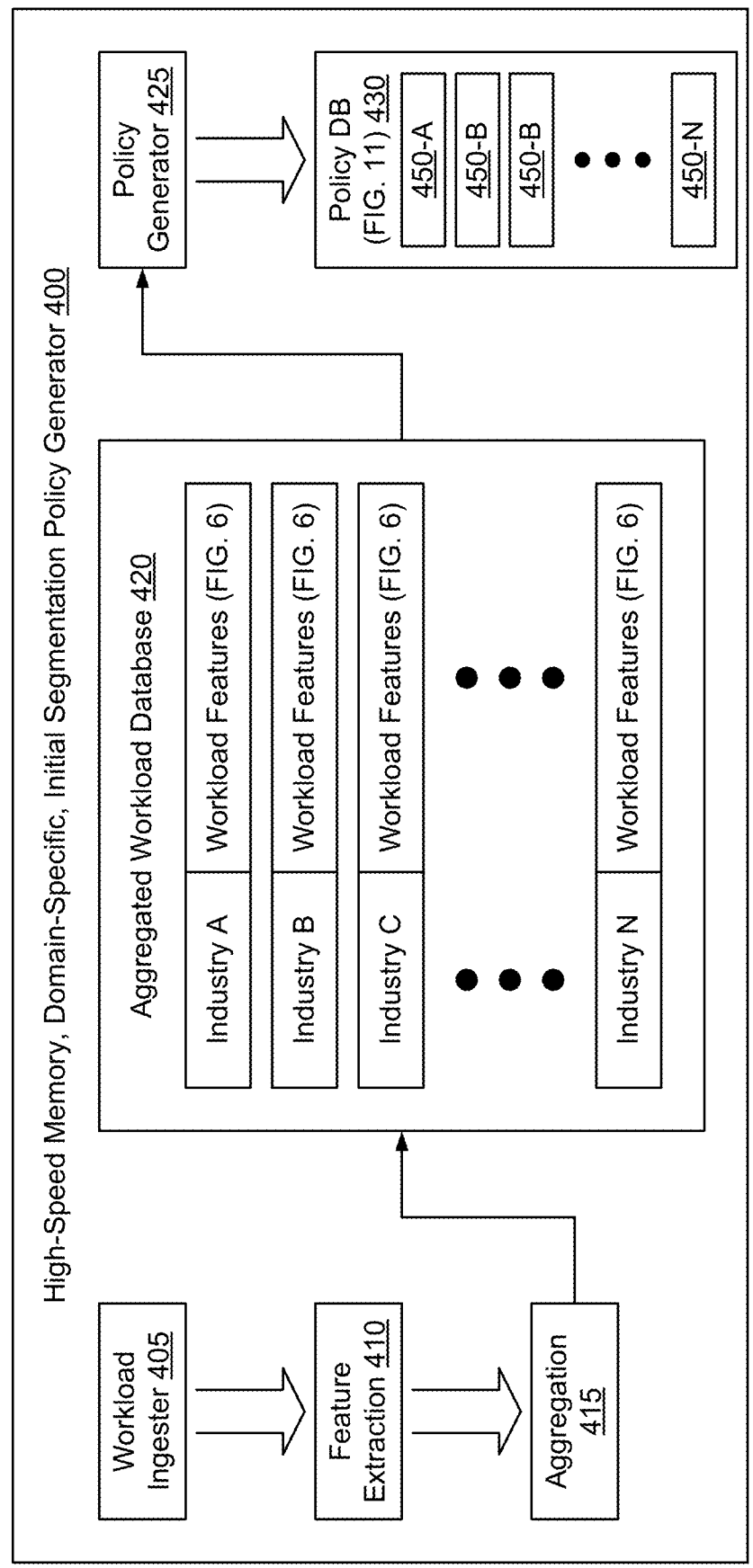
FIG. 4 is a functional block diagram of an example domain-specific initial high-speed memory configuration policy generator, according to some embodiments.
Figure 8:
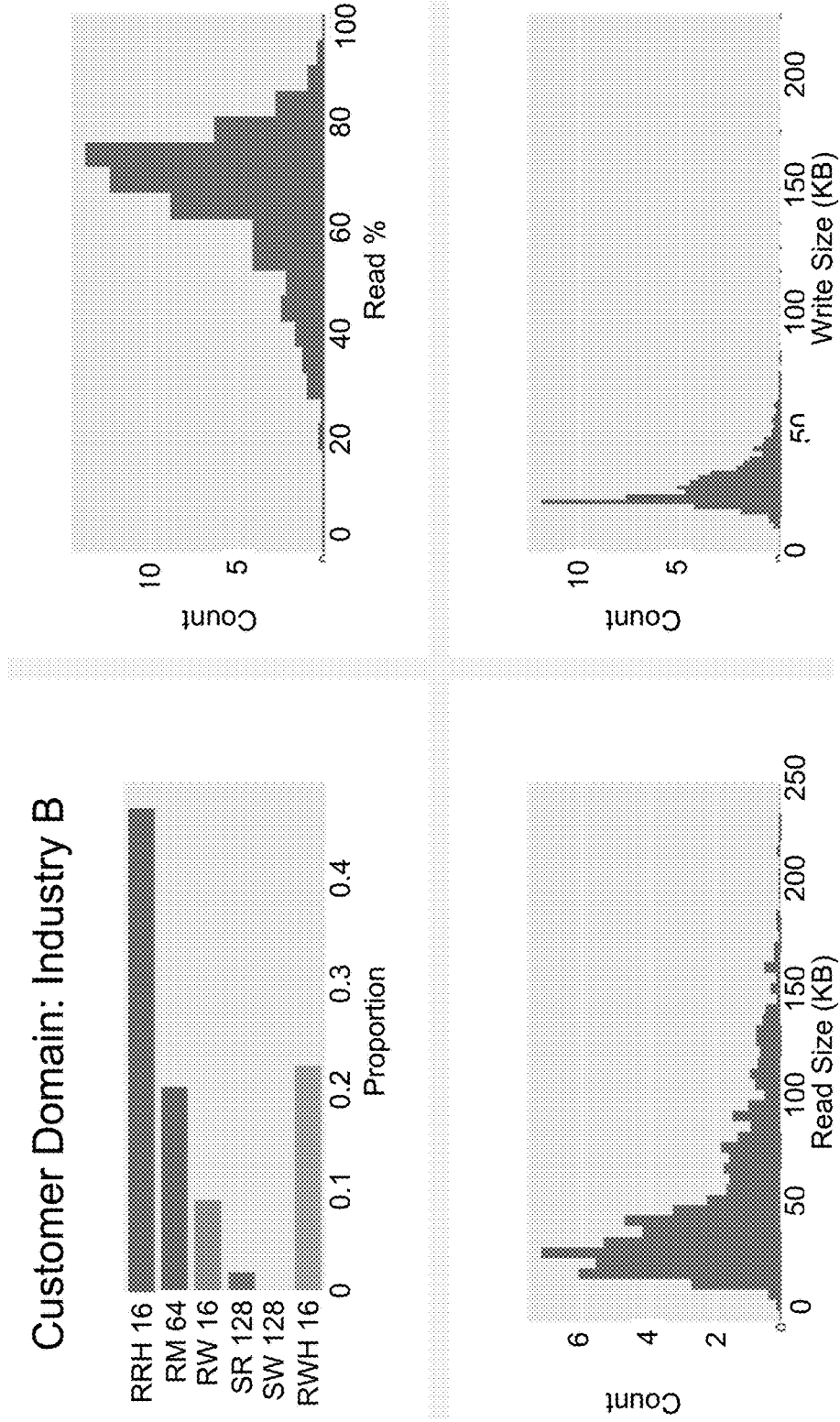
Figure 9:
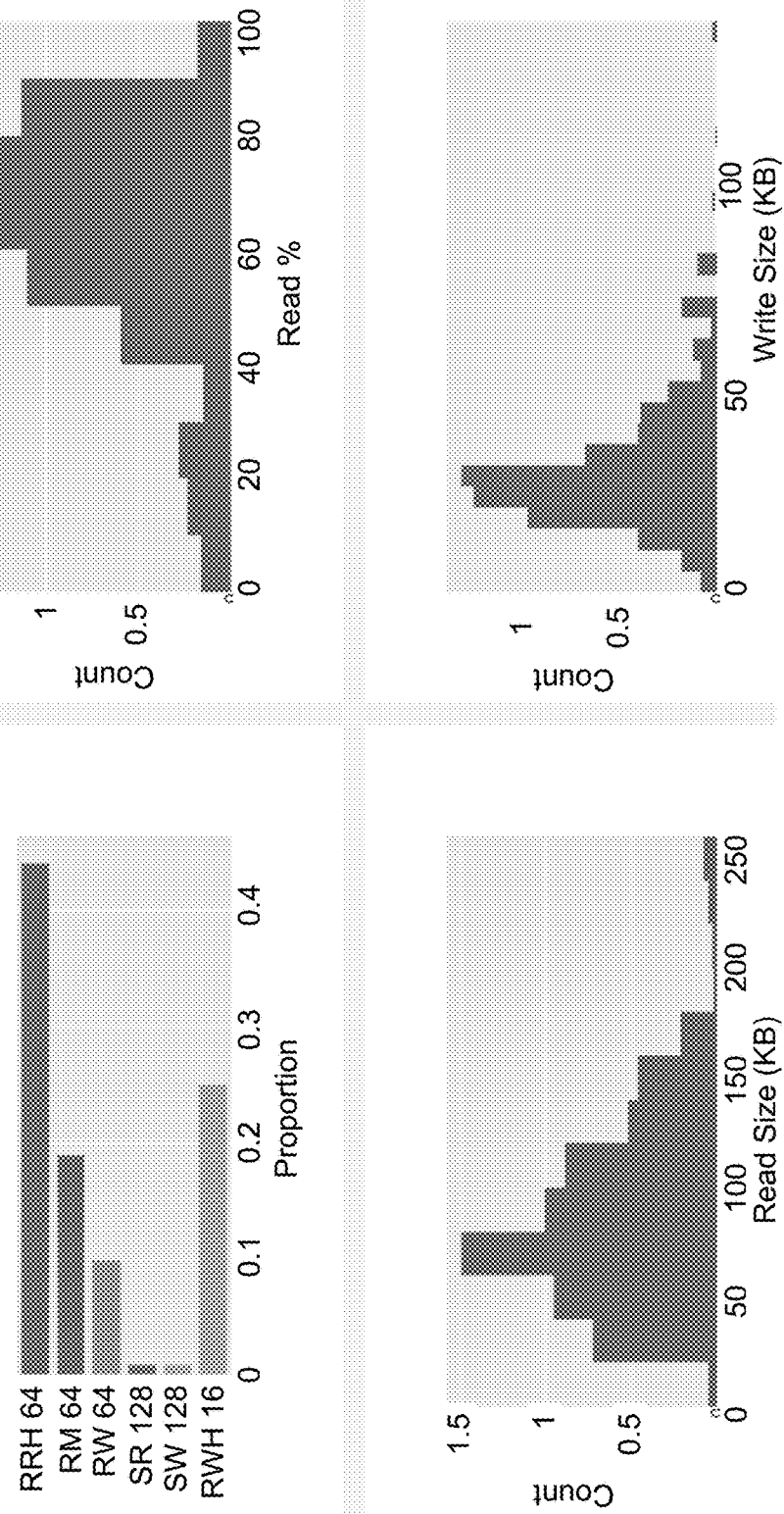
Figure 10:
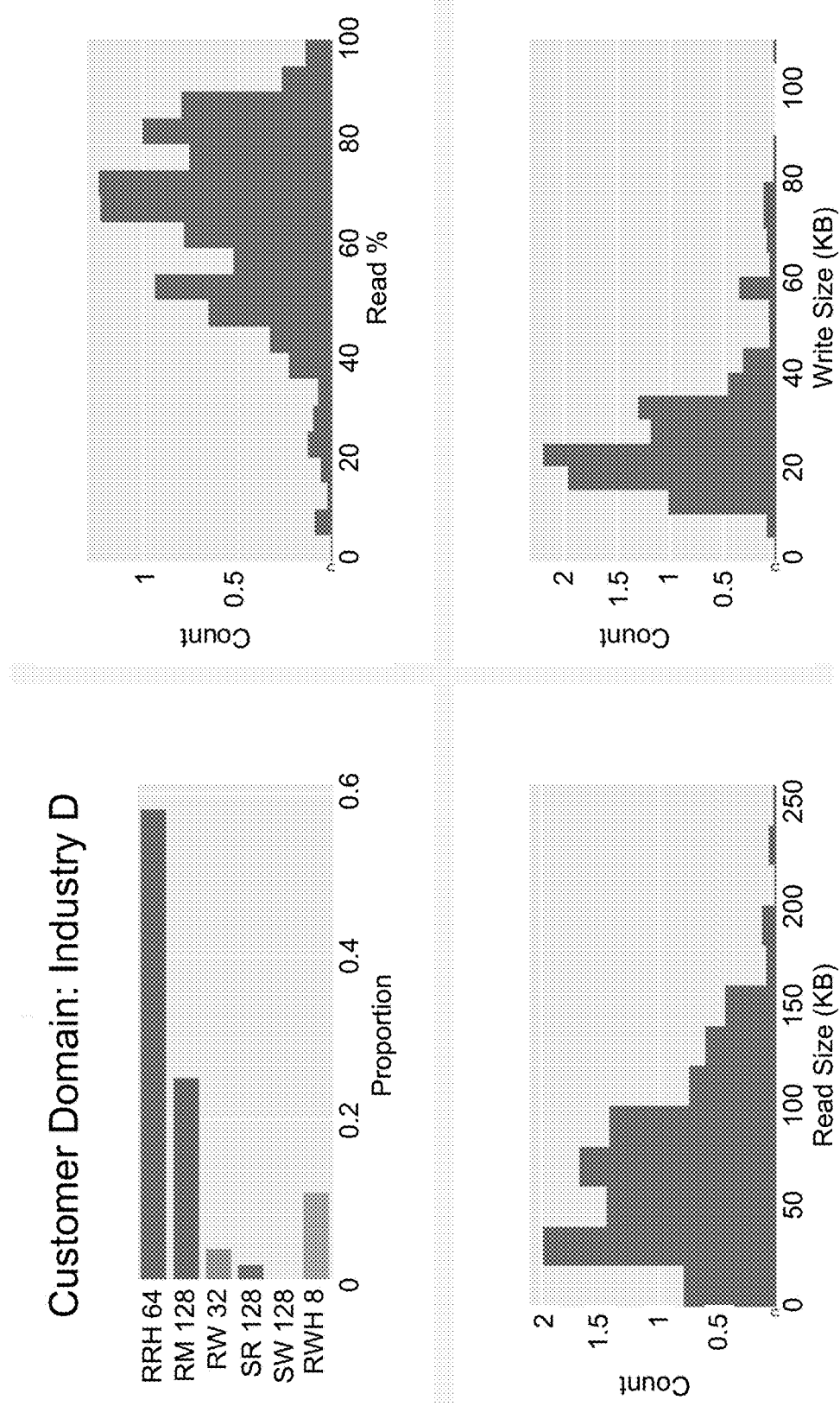

FIG. 4 is a functional block diagram of an example domain-specific initial high-speed memory configuration policy generator 400, according to some embodiments. The example domain-specific initial high-speed memory configuration policy generator 400, in some embodiments, may be implemented on one of the deployed storage systems 100, may be implemented in a computer associated with a customer service system, may be implemented on host 102 as shown in FIG. 1, or may be deployed on another computer depending on the implementation.

As shown in FIG. 4, in some embodiments the domain-specific initial high-speed memory configuration policy generator 400 is configured to determine workload characteristics of workloads performed by a set of deployed storage systems 100. The storage systems 100 are grouped according to customer domain, and the workloads processed by the storage systems that are being used in the same customer domain are analyzed to determine aggregated workload characteristics that are relevant to determining segmentation policies for the customer domain. Accordingly, in some embodiments the domain-specific initial high-speed memory configuration policy generator 400 includes a workload ingester 405 configured to receive workload information from a large number of deployed storage systems. In some embodiments, information about the workload processed by a particular storage system is collected from a storage system monitoring system. An example storage system monitoring system is CloudIQ, available for use with Dell storage systems 100, although other ways of collecting workloads from existing deployed storage systems may be used as well depending on the implementation.

In some embodiments, the workload information received by the workload ingester 405 includes multiple aspects of the workloads processed by the storage systems. However, not all aspects of the workload processed by a given storage system may be relevant to setting policy regions of high-speed memory. Accordingly, in some embodiments feature extraction 410 is used to isolate those features of the workload that are of interest. The workload features are presented to an aggregation engine 415 that aggregates the workload features of interest with similar workload features taken from other storage systems that are being used in the same customer domain. The aggregated workload features are stored in an aggregated workload database 420. For example, as shown in FIG. 4, in some embodiments, the aggregated workload database 420 has an entry for each customer domain (industry A, B, C, N). Each entry contains a set of workload features. An example set of workload features is shown in the example data structure shown in FIG. 6.

For example, as shown in FIG. 6, in some embodiments the workload features include information related to the number of IO operations per second, the total number of read operations, total number of write operations, the percentage of IO operations that are read IO operations vs write IO operations, a histogram of sizes of read operations, a histogram of sizes of write operations, and numerous other workload features that may be used to characterize the workload of the storage systems in the particular customer domain. The workload features are then used by a domain-specific initial high-speed memory configuration policy generator 425 to determine an optimal segmentation of the high-speed memory (size of mirrored policy region vs size of non-mirrored policy region) as well as an optimal set of slot sizes that should be created within each of the policy regions. The domain-specific initial high-speed memory configuration policies are then stored in a policy database 430, an example of which is shown in FIG. 11.

When a new storage system is to be deployed, the customer domain in which the storage system will operate is determined, and used to select a domain-specific initial high-speed memory configuration policy 450 for the storage system. This domain-specific initial high-speed memory configuration policy 450 is used to configure the high-speed memory 124 of the compute nodes 116 of the storage system 100 during the initial deployment of the storage system 100. By initially setting the size of the mirrored and non-mirrored policy regions of the high-speed memory 124 according to the domain-specific initial high-speed memory configuration policy 450 for the customer domain where the storage system will be deployed, and initially setting the segmentation size of the slots of each of the mirrored and non-mirrored policy regions of the high-speed memory according to the domain-specific initial high-speed memory configuration policy, it is possible to more optimally configure the high-speed memory 124 of the compute nodes 116 of the storage system 100 when the storage system 100 is first deployed.

FIG. 5 is a flow chart of an example process configured to create domain-specific initial high-speed memory configuration policies, and to use the domain-specific initial high-speed memory configuration policies when configuring a new storage system, according to some embodiments. As shown in FIG. 5, in some embodiments the domain-specific initial high-speed memory configuration policy generator 400 retrieves storage system workload statistics from a particular storage system that has been deployed and is implementing a customer workload (block 500). Example workload statistics are shown in FIG. 6, but the type of workload statistics and the form of the workload statistics that are collected will depend on the particular implementation. In some embodiments, the workload statistics include the ratio of read IO operations to write IO operations, and information about the size of the read IO operations and write IO operations that enable read IO and write IO histograms to be generated.

The domain-specific initial high-speed memory configuration policy generator 400 then assigns the storage system to one of a plurality of customer domains (block 505). Example customer domains are shown in FIG. 5 as possibly including Services, Telecommunications, Resource Industries, Banking and Depository, Other Financial, etc. There are many types of customer industries (domains) that may be defined, depending on the implementation.

The workload of the storage system that was retrieved in block 500 is then characterized to extract workload features of interest (block 510). Example workload features might include the percentage of read operations, a histogram of read operation sizes, a percentage of write operations, a histogram of write operation sizes, and numerous other features. An example set of workload features is shown in FIG. 6. The workload features of interest are aggregated with similar workload features extracted from workload statistics gathered from other storage systems that have been deployed and are implementing customer workloads in the same customer domain (block 515).

In some embodiments, the domain-specific initial high-speed memory configuration policy generator 400 uses workload information from multiple deployed storage systems to characterize workload features on a per customer-domain basis. Accordingly, in some embodiments, a determination is then made if there are more storage systems to process (block 520). If there is workload information from additional storage systems (a determination of YES at block 520) the process returns to block 500 to process the workload from the next storage system. It should be understood that, in some embodiments, workloads from multiple storage systems may be processed in parallel rather than serially as illustrated in FIG. 5.

When there are no additional storage systems (a determination of NO at block 520) the aggregated workload features are used to create domain-specific initial high-speed memory configuration policies for each customer domain (block 525). For example, in FIG. 5 the domain-specific initial high-speed memory configuration policy generator 400 has enumerated 19 separate customer domains in block 505. In some embodiments, the aggregated workload features from the storage systems that have been deployed in each of those separate customer domains are aggregated and used to create a unique domain-specific initial high-speed memory configuration policy for each of these 19 customer domains.

After the domain-specific initial high-speed memory configuration policies have been created, when a determination is made to deploy a new system (a determination of YES at block 530), the customer domain in which the storage system will be used is determined (block 535). Based on the determined customer domain, the domain-specific initial high-speed memory configuration policy for the determined customer domain is retrieved (block 540). The retrieved domain-specific initial high-speed memory configuration policy for the customer domain is then used to set the initial sizes of the policy regions of high-speed memory (mirrored policy region vs non-mirrored policy region) of the compute nodes 116, as well as the slot size allocations within each of the policy regions (block 545).

FIGS. 7-10 are graphs of example workload features of example customer domains for four example industries, according to some embodiments. Each of FIGS. 7-10 contain 4 graphs: upper left, upper right, lower left, and lower right.

The upper left graph in each of these figures shows the proportion of workload in the particular industry that falls within the following six categories:
RRH: Random Read Hit—a non-sequential read IO operation that is able to be served from data that was previously stored in the high-speed memory
RM: Read Miss—a non-sequential read IO operation that is not able to be served from data that was previously stored in high-speed memory
RW: Write Miss—a non-sequential write IO operation that is not on data that was previously stored in high-speed memory
SR: Sequential Read—a sequential read IO operation
SW: Sequential Write—a sequential write IO operation
RWH: Random Write Hit—a non-sequential write IO operation that is on data that was previously stored in high-speed memory The upper right graph compares the percentage read operations for the industry with the total IO count (in millions of IO operations) that occurred at that read percentage. A read percentage of 60%, for example, would indicate that the write percentage was 40% since the total read and write operations equal 100%. A higher count value indicates that more of the workload in the industry occurred at the particular read percentage.

The lower left graph compares the read size (KB) with the IO count (number of IO operations in millions of IO operations), whereas the lower right graph compares the write size (KB) with the IO count (number of IO operations in millions of IO operations). The lower left graph accordingly is a histogram of read IO operations and the lower right graph is a histogram of write IO operations. A histogram, as that term is used herein, is a data structure correlating IO size (x axis) and number of IOs per unit IO size (y axis). For example, a histogram may divide IOs into size ranges of 8K or 16K increments. Any IO operations that occur within each of the increments is added to the histogram such that the y axis values indicate the number of IO operations that occurred that had a size within the respective size range.

By comparing the graphs for the several example customer domains shown in FIGS. 7-10, it is clear that different customer domains associated with different industries exhibit different workload characteristics. For example, the read histogram for Industry A shows that a majority of read IO operations in Industry A have a size of between 50-150 KB, whereas the read histogram for Industry B shows that a majority of read IO operations in Industry B have a size of between 0-50 KB. There are also apparent differences between the sizes of the write IO operations, as indicated by the different shapes of the write IO histograms for Industry A vs Industry B.

In some embodiments, the domain-specific initial high-speed memory configuration policy generator 400 uses the proportion read and proportion write information shown in the top left graph of each of FIGS. 7-11 to set the initial segmentation size of the non-mirrored policy region of high-speed memory and the mirrored policy region of high-speed memory. Specifically, the mirrored policy region of high-speed memory is used to store data associated with write operations. In some embodiments the proportion of high-speed memory used to implement the mirrored policy region is set to equal the sum of the proportion (sum of percentages) of the types of write operations:

Mirrored policy region (% of high-speed memory)=RW (%)+SW (%)+RWH (%).

Similarly, the proportion of high-speed memory used to implement the non-mirrored policy region is set to equal the sum of the proportion of the types of read operations:

Non-mirrored policy region (% of high-speed memory)=RRH (%)+RM (%)+SR (%).

In some embodiments, the read histogram (lower left graphs in FIGS. 7-10) and the write histograms (lower right graphs in FIGS. 7-10) are used to determine slot size allocations within each of the mirrored and non-mirrored the policy regions. Depending on the implementation, the slot sizes of high-speed memory may be configured to be selected from one of a finite number of slot sizes. For example, some storage systems may be configured to use slots selected from one of a number of possible fixed slot sizes, such as to use slots selected from 16 KB, 64 KB, and 128 KB slot sizes. Other storage systems may have different possible slot sizes, such as 8 KB, 16 KB, 32 KB, 64 KB, and 128 KB slot sizes. The particular selection of slot sizes will depend on the implementation.

In some embodiments, to determine a range of segmentation sizes for the mirrored policy region, a histogram of the number of write IO operations for a set of 10 size ranges is created, by determining the average 'write' size feature of the workload on the customer domain. The number of write IOs that occurred of each write size is added to the histogram. At the end of processing all workloads from the set of storage systems deployed in the customer domain, the histogram will contain a distribution of write IO operations based on write IO size for the customer domain. A similar read IO histogram is created based on the read IO sizes and numbers of read IO operations of each respective read IO size.

In some embodiments, a segmentation policy specifies a distribution of segmentation size allocations defining the size of slots that should be created in each of the policy regions of the high-speed memory. In some embodiments, the segmentation policy specifies a limited number of fixed size slots that can be allocated from high-speed memory. For example, the segmentation policy might specify how much of each of the policy regions should be used in connection with allocating slots having 16 KB, 64 KB, and 128 KB slot sizes. Larger slot sizes are useful in connection with processing larger IOs, however for smaller IOs, using smaller slot sizes enables a larger number of slots to be allocated from the same amount of memory, thereby increasing the number of IOs that are able to be processed using the same amount of high-speed memory. Alternatively, reducing the slot size for a portion of the policy regions enables a smaller amount of high-speed memory to be used to support the same number of IO operations.

Although some embodiments are described in which the segmentation policy specifies the amount of each policy region that should be used to allocate slots having slot sizes of 16 KB, 64 KB, and 128 KB, it should be understood that other memory slot sizes might be used as well, depending on the implementation. In some embodiments, the slot sizes determined by the segmentation policy will be the same for both the non-mirrored and the mirrored policy regions. However, it should be understood that different slot sizes might be used in the different policy regions, depending on the implementation. For example, the non-mirrored policy region might use slots having slot sizes of 8 KB, 16 KB, 64 KB, and 128 KB, whereas the mirrored policy region might use slots having slot sizes of 32 KB, 64 KB, and 128 KB. Thus, the particular slot size segmentation within each of the policy regions might vary depending on the implementation.

In some embodiments, the amount of high-speed memory that should be segmented for the mirrored policy region using a particular segmentation size is calculated as:

$$N\text{th pool size}=\%\text{ of write IO distribution}*\%\text{ of write IOs in the range of the }N\text{th pool size}$$

In which the % of write IO distribution is used to determine the size of the mirrored policy region, and the % of write IOs in the range of the Nth pool size (slot size) is based on the number of IOs having a write IO size that would be able to be served from a slot having the size of the Nth pool size.

For example, if the high-speed memory segmentation includes three slot sizes equal to 16 KB, 64 KB, and 128 KB, the amount of high-speed that should be allocated to each of these segmentation sizes to implement the mirrored (write IO) policy region is calculated as:

Mirrored Policy Region Segmentation Distribution:
  % policy region segmented using 16 KB slots=% write IO distribution*% of write IOs having size between 0 KB and 16 KB (IO write size <16 KB)
  % policy region segmented using 64 KB slots=% write IO distribution*% of write IOs having size between 16 KB and 64 KB (16 KB<IO write size <64 KB)
  % policy region segmented using 128 KB slots=% write IO distribution*% of write IOs having size between 64 KB and 128 KB (64 KB<IO write size)

In some embodiments, the amount of high-speed memory that should be segmented for the non-mirrored policy region using a particular segmentation size is calculated as:

$$N\text{th pool size}=\%\text{ of read IO distribution}*\%\text{ of read IOs in the range of the }N\text{th pool size}$$

In which the % of read IO distribution is used to determine the size of the non-mirrored policy region, and the % of read IOs in the range of the Nth pool size (slot size) is based on the number of IOs having a read IO size that would be able to be served from a slot having the size of the Nth pool size.

For example, for the non-mirrored (read IO) policy region, if the high-speed memory segmentation includes three segmentation sizes equal to 16 KB, 64 KB, and 128 KB, the amount of high-speed that should be allocated to each of these segmentation sizes to implement the non-mirrored policy region is calculated as:

Non-Mirrored Policy Region Segmentation Distribution:
  % policy region segmented using 16 KB slots=% read IO distribution*% of read IOs having size between 0 KB and 16 KB (IO read size <16 KB)
  % policy region segmented using 64 KB slots=% read IO distribution*% of read IOs having size between 16 KB and 64 KB (16 KB<IO read size <64 KB)
  % policy region segmented using 128 KB slots=% read IO distribution*% of read IOs having size between 64 KB and 128 KB (64 KB<IO read size)

In some embodiments, the % of read IOs or write IOs having a size between any particular size values can be ascertained from the respective read histogram and write histogram for the industry.

FIG. 11 is a functional block diagram of an example data structure configured to store domain-specific initial high-speed memory configuration policies on a per customer-domain basis, according to some embodiments. As shown in FIG. 11, in some embodiments, each domain-specific initial high-speed memory configuration policy specifies the proportion of high-speed memory that should be used to implement the mirrored policy region (mirrored (write IO) pool size %) as well the proportion of high-speed memory that should be used to implement the non-mirrored policy region (non-mirrored (read IO) pool size %). In some embodiments, the domain-specific initial high-speed memory configuration policy also specifies the slot configuration that is required to be implemented in each of the non-mirrored and mirrored policy regions.

For example, in FIG. 11, the domain-specific initial high-speed memory configuration policy for industry A, 450-A, specifies that the mirrored policy region should use 35% of the high-speed memory, and that within the mirrored pool, 10% of the high-speed memory should be divided into slots having slot size 1, 15% of the high-speed memory should be divided into slots having slot size 2, and 10% of the high-speed memory should be divided into slots having slot size 3. The domain-specific initial high-speed memory configuration policy for industry A, 450-A, further specifies that the non-mirrored policy region should use 65% of the high-speed memory, and that within the non-mirrored policy region, 5% of the high-speed memory should be divided into slots having slot size 1, 50% of the high-speed memory should be divided into slots having slot size 2, and 10% of the high-speed memory should be divided into slots having slot size 3.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of configuring initial high-speed memory of a newly deployed storage system, comprising:
creating domain-specific initial high-speed memory configuration policies for each of a plurality of customer domains, each domain-specific initial high-speed memory configuration policy specifying a first size of a mirrored policy region of the high-speed memory, a first distribution of slot sizes to be created within the mirrored policy region, a second size of a non-mirrored policy region of the high-speed memory, and a second distribution of slot sizes to be created within the second mirrored policy region;
determining a particular customer domain of the newly deployed storage system;
selecting one of the domain-specific initial high-speed memory configuration policies created for the determined particular customer domain; and
applying the selected one of the domain-specific initial high-speed memory configuration policies to configure the high-speed memory of the newly deployed storage system.

2. The method of claim 1, wherein the mirrored policy region is a region of high-speed memory in which each slot allocated from the high-speed memory in the mirrored policy region is mirrored with a second slot allocated from the high-speed memory; and
wherein the non-mirrored policy region is a region of high-speed memory in which each slot allocated from the high-speed memory in the non-mirrored policy region is not mirrored with a second slot allocated from the high-speed memory.

3. The method of claim 1, wherein creating domain-specific initial high-speed memory configuration policies for each of a plurality of customer domains comprises, for each respective customer domain:
characterizing workloads of a plurality of storage systems deployed in the respective customer domain to extract a plurality of workload features characterizing the workloads of the customer domain;
aggregating workload features from the plurality of characterized workloads; and
using the aggregated workload features to specify the first size of the mirrored policy region of the high-speed memory, the first distribution of slot sizes to be created within the mirrored policy region, the second size of the non-mirrored policy region of the high-speed memory, and the second distribution of slot sizes to be created within the second mirrored policy region of the domain-specific initial high-speed memory configuration policy for the respective customer domain.

4. The method of claim 3, wherein each respective customer domain is a different industry, and the plurality of storage systems deployed in the respective customer domain are storage systems that have been deployed to process the workloads in connection with implementing storage transactions in the respective industry.

5. The method of claim 3, wherein using the aggregated workload features comprises:
determining, from the aggregated workload features, a percentage IO read value for the respective customer domain and percentage IO write value for the respective customer domain, the percentage IO read value and percentage IO write value being based on a ratio of read IO operations to write IO operations;

setting the first size of the mirrored policy region in the domain-specific initial high-speed memory configuration policy for the respective customer domain based on the percentage IO write value; and setting the second size of the non-mirrored policy region in the domain-specific initial high-speed memory configuration policy for the respective customer domain based on the percentage IO read value.

6. The method of claim 5, wherein the aggregated workload features sort total IO operations in the aggregated workloads to determine proportions of the total IO operations that are related to random read hit IO operations, random read miss IO operations, sequential read IO operations, random write hit IO operations, random write miss IO operations, and sequential write IO operations;

wherein the first size of the mirrored policy region is set based on a sum of the proportion of random read hit IO operations, the proportion of random read miss IO operations, and the proportion of sequential read IO operations; and wherein the second size of the non-mirrored policy region is set based on a sum of the proportion of random write hit IO operations, the proportion of random write miss IO operations, and the proportion of sequential write IO operations.

7. The method of claim 3, wherein the aggregated workload features includes a read IO size feature, and wherein using the aggregated workload features comprises using the read IO size feature to populate a read IO histogram data structure correlating read IO size and a number of read IOs per unit IO size; and wherein the aggregated workload features includes a write IO size feature, and wherein using the aggregated workload features comprises using the write IO size feature to populate a write IO histogram data structure correlating write IO size and a number of write IOs per unit IO size.

8. The method of claim 7, further comprising:

setting the first distribution of slot sizes to be created within the mirrored policy region in the domain-specific initial high-speed memory configuration policy for the respective customer domain based on the content of the write IO histogram data structure; and setting the second distribution of slot sizes to be created within the non-mirrored policy region in the domain-specific initial high-speed memory configuration policy for the respective customer domain based on the content of the read IO histogram data structure.

9. The method of claim 8, wherein the first distribution of slot sizes specifies a first proportion of slot sizes of a first size and a second proportion of slot sizes of a second size; and wherein the second distribution of slot sizes specifies a third proportion of slot sizes of a third size and a fourth proportion of slot sizes of a fourth size.

10. A system for configuring initial high-speed memory of a newly deployed storage system, comprising:

one or more computers and one or more storage devices storing instructions that are operable, when executed by the one or more computers, to cause the one or more computers to perform operations comprising:

creating domain-specific initial high-speed memory configuration policies for each of a plurality of customer domains, each domain-specific initial high-speed memory configuration policy specifying a first size of a mirrored policy region of the high-speed memory, a first distribution of slot sizes to be created within the mirrored policy region, a second size of a non-mirrored policy region of the high-speed memory, and a second distribution of slot sizes to be created within the second mirrored policy region;

determining a particular customer domain of the newly deployed storage system;

selecting one of the domain-specific initial high-speed memory configuration policies created for the determined particular customer domain; and applying the selected one of the domain-specific initial high-speed memory configuration policies to configure the high-speed memory of the newly deployed storage system.

11. The system of claim 10, wherein the mirrored policy region is a region of high-speed memory in which each slot allocated from the high-speed memory in the mirrored policy region is mirrored with a second slot allocated from the high-speed memory; and wherein the non-mirrored policy region is a region of high-speed memory in which each slot allocated from the high-speed memory in the non-mirrored policy region is not mirrored with a second slot allocated from the high-speed memory.

12. The system of claim 10, wherein creating domain-specific initial high-speed memory configuration policies for each of a plurality of customer domains comprises, for each respective customer domain:

characterizing workloads of a plurality of storage systems deployed in the respective customer domain to extract a plurality of workload features characterizing the workloads of the customer domain;

aggregating workload features from the plurality of characterized workloads; and using the aggregated workload features to specify the first size of the mirrored policy region of the high-speed memory, the first distribution of slot sizes to be created within the mirrored policy region, the second size of the non-mirrored policy region of the high-speed memory, and the second distribution of slot sizes to be created within the second mirrored policy region of the domain-specific initial high-speed memory configuration policy for the respective customer domain.

13. The system of claim 12, wherein each respective customer domain is a different industry, and the plurality of storage systems deployed in the respective customer domain are storage systems that have been deployed to process the workloads in connection with implementing storage transactions in the respective industry.

14. The system of claim 12, wherein using the aggregated workload features comprises:

determining, from the aggregated workload features, a percentage IO read value for the respective customer domain and percentage IO write value for the respective customer domain, the percentage IO read value and percentage IO write value being based on a ratio of read IO operations to write IO operations;

setting the first size of the mirrored policy region in the domain-specific initial high-speed memory configuration policy for the respective customer domain based on the percentage IO write value; and setting the second size of the non-mirrored policy region in the domain-specific initial high-speed memory configuration policy for the respective customer domain based on the percentage IO read value.

15. The system of claim 14, wherein the aggregated workload features sort total IO operations in the aggregated workloads to determine proportions of the total IO operations that are related to random read hit IO operations, random read miss IO operations, sequential read IO operations, random write hit IO operations, random write miss IO operations, and sequential write IO operations;
- wherein the first size of the mirrored policy region is set based on a sum of the proportion of random read hit IO operations, the proportion of random read miss IO operations, and the proportion of sequential read IO operations; and
- wherein the second size of the non-mirrored policy region is set based on a sum of the proportion of random write hit IO operations, the proportion of random write miss IO operations, and the proportion of sequential write IO operations.

16. The system of claim 12, wherein the aggregated workload features includes a read IO size feature, and wherein using the aggregated workload features comprises using the read IO size feature to populate a read IO histogram data structure correlating read IO size and a number of read IOs per unit IO size; and
- wherein the aggregated workload features includes a write IO size feature, and wherein using the aggregated workload features comprises using the write IO size feature to populate a write IO histogram data structure correlating write IO size and a number of write IOs per unit IO size.

17. The system of claim 16, the instructions are further operable to cause the one or more computers to perform operations comprising:
- setting the first distribution of slot sizes to be created within the mirrored policy region in the domain-specific initial high-speed memory configuration policy for the respective customer domain based on the content of the write IO histogram data structure; and
- setting the second distribution of slot sizes to be created within the non-mirrored policy region in the domain-specific initial high-speed memory configuration policy for the respective customer domain based on the content of the read IO histogram data structure.

18. The system of claim 17, wherein the first distribution of slot sizes specifies a first proportion of slot sizes of a first size and a second proportion of slot sizes of a second size; and
- wherein the second distribution of slot sizes specifies a third proportion of slot sizes of a third size and a fourth proportion of slot sizes of a fourth size.

* * * * *